United States Patent [19]
Voss et al.

[11] Patent Number: 5,114,554
[45] Date of Patent: * May 19, 1992

[54] REMOVAL OF ACID FROM CATHODIC ELECTROCOATING BATHS BY ELECTRODIALYSIS

[75] Inventors: Hartwig Voss, Frankenthal; Thomas Bruecken, Dortmund, both of Fed. Rep. of Germany

[73] Assignee: BASF Aktiengesellschaft, Ludwigshafen, Fed. Rep. of Germany

[*] Notice: The portion of the term of this patent subsequent to Feb. 25, 2009 has been disclaimed.

[21] Appl. No.: 278,353

[22] Filed: Dec. 1, 1988

[30] Foreign Application Priority Data

Dec. 2, 1987 [DE] Fed. Rep. of Germany ....... 3740785

[51] Int. Cl.$^5$ .............................................. B01D 13/02
[52] U.S. Cl. ................. 204/182.4; 204/180.8; 204/301; 204/DIG. 13
[58] Field of Search .................. 204/182.5, 182.4, 301, 204/180.8, DIG. 13

[56] References Cited

U.S. PATENT DOCUMENTS

| | | | |
|---|---|---|---|
| 3,165,415 | 1/1965 | Kilburn et al. | 204/182.4 |
| 3,663,405 | 5/1972 | Christenson et al. | 204/182.4 |
| 3,663,406 | 5/1972 | LeBras et al. | 204/181 |
| 3,784,460 | 1/1974 | Le Bras et al. | 204/301 |
| 4,115,225 | 9/1978 | Parsi | 204/180 P |
| 4,284,492 | 8/1981 | Karn | 204/301 |
| 4,608,141 | 8/1986 | Chlanda et al. | 204/182.5 |

FOREIGN PATENT DOCUMENTS

| | | |
|---|---|---|
| 2111080 | 6/1983 | United Kingdom. |
| 0156341 | 10/1985 | European Pat. Off.. |
| 3243770 | 7/1983 | Fed. Rep. of Germany. |
| 3642164 | 6/1988 | Fed. Rep. of Germany. |

OTHER PUBLICATIONS

Patent Abstracts of Japan, 55-50493, vol. 4, No. 85, (Jun. 18, 1980).

*Primary Examiner*—John F. Niebling
*Assistant Examiner*—Arun S. Phasge
*Attorney, Agent, or Firm*—Keil & Weinkauf

[57] ABSTRACT

Acid is removed from cathodic electrocoating baths in which electroconductive substrates are being coated with cationic resins present in the form of aqueous dispersions, at least a portion of the coating bath being subjected to an ultrafiltration where the ultrafiltration membrane retains the cationic resin to form an ultrafiltrate which contains water, solvent, low molecular weight substances and ions and is at least partly recycled into the coating bath, by subjecting at least a portion of the ultrafiltrate to a specific electrodialysis treatment before returning it into the electrocoating bath.

10 Claims, 1 Drawing Sheet

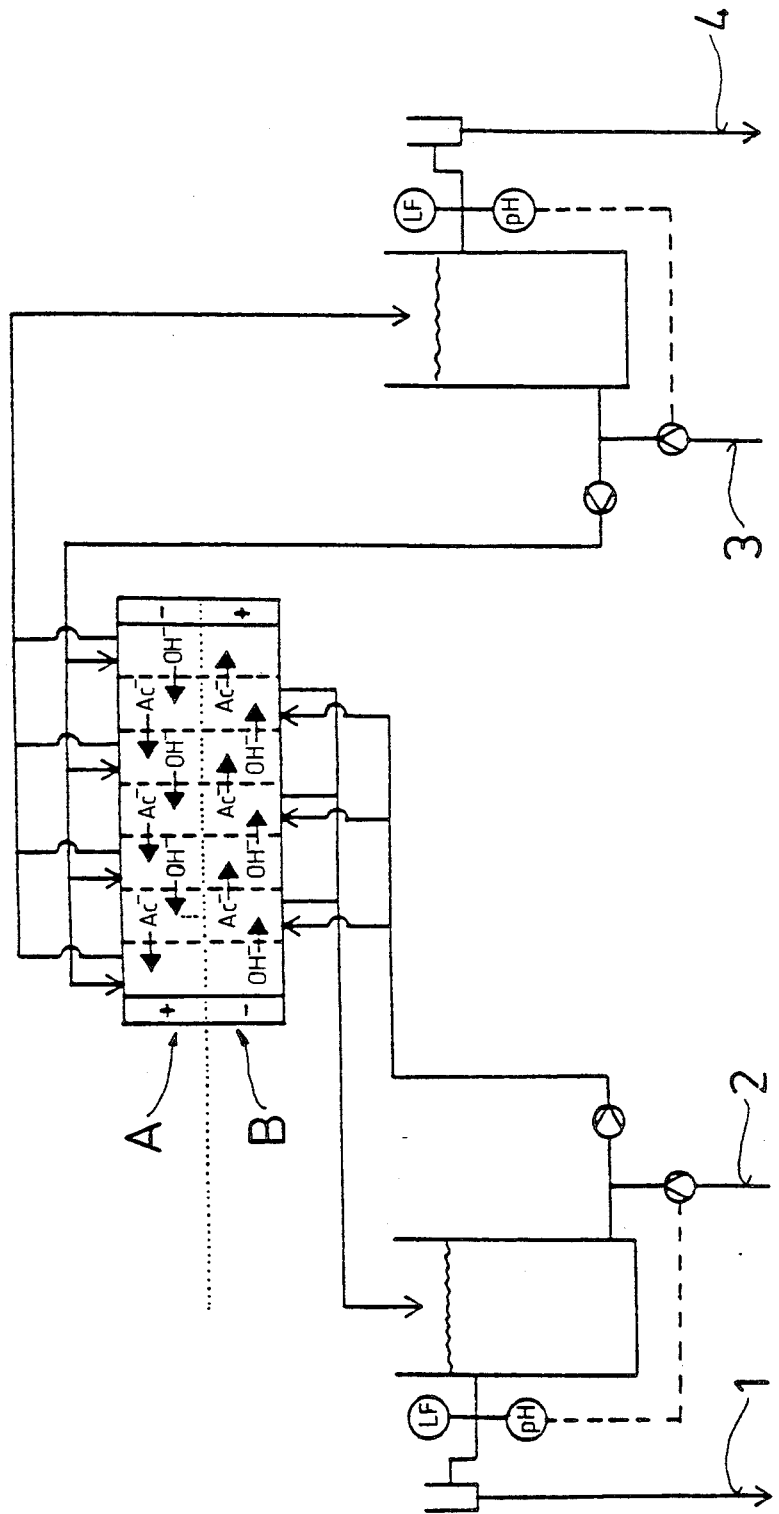

REMOVAL OF ACID FROM CATHODIC ELECTROCOATING BATHS BY ELECTRODIALYSIS

The present invention relates to a novel process for removing acid from cathodic electrocoating baths in which electroconductive substrates are being coated with cationic resins present in the form of aqueous dispersions and at least a portion of the coating bath is subjected to an ultrafiltration where ultrafiltration membrane retains the cationic resin to form an ultrafiltrate which contains water, solvent, low molecular weight substances and ions and is at least partly recycled into the coating bath.

Cathodic electrocoating is known and is described for example in F. Loop, Cathodic electrodeposition for automotive coatings, World Surface Coatings Abstracts (1978), Abs. 3929.

In this process, electroconductive substrates are coated with cationic resins present in the form of aqueous dispersions. Cathodically depositable resins customarily contain amino groups. To convert the resins into a stable aqueous dispersion, these groups are protonated with customary acids (also referred to as solubilizing agents in some publications) such as formic acid, acetic acid, lactic acid or phosphoric acid. In an electrocoating process, the protonation is reversed again in the immediate vicinity of the metallic article to be coated, by neutralization with the hydroxyl ions formed by electrolytic water decomposition, so that the binder precipitates on the substrate. The acid is not coprecipitated, so that with time there is a buildup of acid in the bath. As a result, the pH decreases, which leads to destabilization of the electrocoating bath. For this reason, the surplus acid must be neutralized or removed from the bath.

U.S. Pat. No. 3,663,405 describes the ultrafiltration of electrocoating compositions. In ultrafiltration, the electrocoating composition is passed under a certain pressure along a membrane which retains the higher molecular weight constituents but lets the low molecular weight constituents such as organic impurities, decomposition products, inorganic salts, resin-solubilizing agents (acids) and solvents, pass through. To remove these low molecular weight constituents, a portion of the ultrafiltrate is discarded and thus removed from the system. Another portion of the ultrafiltrate is passed into the rinse deck of the paintline and is used there for rinsing off the dragout still adhering to the coated articles. Ultrafiltrate and rinsed-off dragout are returned into the electrocoating tank for the purposes of recovery. Since excess solubilizing agent occurs in large amounts, it is not possible to remove it from the bath to a sufficient degree by discarding ultrafiltrate.

U.S. Pat. No. 3,663,406 describes the parallel application of ultrafiltration and electrodialysis for working up and controlling the solubilizing agent balance of electrocoating baths. The electrodialysis cell is installed in the electrocoating tank in such a way that the counterelectrode to the coated article is separated from the coating dispersion by an ion exchange membrane and an electrolyte containing the solubilizing agent. By applying an electric field, the ions of opposite charge to the ionic resin groups are made to pass through the ion exchange membrane into the electrolyte and can be bled out from there by way of a separate circulation system. These electrodialysis units installed in the electrocoating tank take up a lot of space and are very expensive to service and repair. The membranes can become blocked with particles from the coating or can be mechanically damaged by the articles to be coated, so that replacement of the membranes becomes necessary. This is time- and labor-consuming and can put the coating process out of operation for a certain period. Ultrafiltration is only required to produce rinse water for the paintline.

For this reason there are processes whereby it is possible to transfer the electrodialysis operation from the electrocoating tank to the periphery of the plant. DE-A-3,243,770 and EP-A-0,156,341 describe processes of this type, where the portion of the ultrafiltrate which is recycled into the rinse zone and then into the electrocoating tank is subjected before entry into the rinse zone to a treatment in the cathode space of an electrolysis cell divided by an anion exchanger membrane. In this way the solubilizing agent (acid) accumulated in the ultrafiltrate can be removed from the coating process. The great disadvantage of these electrolysis processes is that lead from an anticorrosion pigment customarily used in cathodic electrocoating is deposited from the ultrafiltrate at the cathode, as well as other cations. For this reason the cathode was designed to be movable and hence regenerable, which is very expensive.

The electrodialysis processes described in German Patent Application P 36 42 164.2 are a significant improvement in that, without the above-described disadvantages, essentially only the acid which solubilizes the resin suspension is separated from the ultrafiltrate. This is achieved by A) passing the ultrafiltrate through the chambers $K_1$ of an electrodialysis cell $Z_A$ comprising the characteristic sequence $$-(K_2-M_1-K_1-M_1)_n-,$$

where $M_1$ is an anion exchanger membrane and n is from 1 to about 500, and passing an aqueous base through the chambers $K_2$, or by B) passing the ultrafiltrate through the chambers $K_1$ of an electrodialysis cell $Z_B$ comprising the characteristic sequence $$-(K_2-M_1-K_1-M_2)_n-,$$

where $M_1$ is an anion exchanger membrane and $M_2$ is a bipolar membrane, and passing water or an electrolyte preferably the acid to be separated off, a salt of this acid or a mixture thereof, through the chambers $K_2$, or by C) passing the ultrafiltrate through the chambers $K_1$ of an electrodialysis cell $Z_c$ comprising the characteristic sequence $$-(K_3-M_1-K_1-M_1-K_2-M_2)_n-,$$

where $M_1$ is an anion exchanger membrane and $M_2$ is a cation exchanger membrane, and passing an aqueous base through the chambers $K_2$ and water or an electrolyte, preferably the acid to be separated off, a salt of this acid or a mixture thereof, through the chambers $K_3$, and carrying on the electrodialysis to the desired degree of deacidification.

It has been found, however, that depending on process conditions (for example a high bleed pH of the ultrafiltrate in feed & bleed operation, the electrocoating bath composition or the separating efficiency of the ultrafiltration) organic material (low molecular weight fragments of the resin or binder material) may build up on the membrane with time, thereby slowing down the process of deacidification.

It is an object of the present invention to remove excess acid from the ultrafiltrate of cathodic electrocoating baths without incurring the disadvantages described above.

We have found that this object is achieved with a process for removing acid from a cathodic electrocoating bath in which an electroconductive substrate is being coated with a cationic resin in the form of an aqueous dispersion by separation of the dispersion by ultrafiltration into a resin dispersion and an ultrafiltrate and deacidification of the ultrafiltrate by passing the ultrafiltrate through the chambers $K_1$ of a direct current operated electrodialysis cell comprising the characteristic sequence $$-(K_2-M_1-K_1-M_1)_n-,$$

where $M_1$ is an anion exchanger membrane and n is from 1 to about 500, and passing an aqueous base through the chambers $K_2$, which comprises reversing the polarity of the electric field responsible for ion transport through the membrane.

Cathodic electrocoating is feasible with a large number of coating composition. Ionic character is conferred upon the coating composition by cationic resins which customarily contain amino groups which are neutralized with customary acids, for example formic acid, acetic acid, lactic acid or phosphoric acid, to form cationic salt groups. Cationically depositable compositions of this type are described for example in U.S. Pat. No. 4,031,050, U.S. Pat. No. 4,190,567, DE-A-2,752,555 and EP-A-12,463.

These cationic resin dispersions are customarily combined with pigments, soluble dyes, solvents, flow improvers, stabilizers, antifoams, crosslinkers, curing catalysts, salts of lead and other metals, and sundry auxiliary and additive substances as well, to give the electrocoating finishes.

For cathodic electrocoating, the solids content of the electrocoating bath is generally standardized at from 5 to 30, preferably from 10 to 20, % by weight by dilution with deionized water. Deposition generally takes place at from 15° to 40° C. in from 1 to 3 minutes and at pH 5.0-8.5, preferably pH 6.0-7.5, using deposition voltages ranging from 50 to 500 volts. After the film deposited on the electroconductive article has been rinsed off, the said film is cured at from about 140° C. to 200° C. in from 10 to 30 minutes, preferably at from 150° to 180° C. in about 20 minutes.

Electrocoating baths are generally run continuously, i.e., the articles to be coated are uninterruptedly introduced into the bath, coated and then removed. This in turn makes it necessary to charge the bath uninterruptedly with coating composition.

It only takes a short time of operation for undesirable impurities and solubilizing agents to accumulate in the bath. Examples of such impurities are oils, phosphates and chromates, which are brought into the bath by the substrates to be coated, carbonates, excess solubilizing agents, solvents and oligomers which accumulate in the bath since they are not codeposited with the resin. Undersirable constituents of this type have an adverse effect on the coating process, so that the chemical and physical properties of the deposited film become unsatisfactory.

To remove these impurities and to keep the composition of the electrocoating bath relatively constant, a portion of the bath is drawn off and subjected to ultrafiltration.

The solutions to be ultrafiltered are brought into contact in a cell with a filtration membrane arranged on a porous carrier under pressure, for example from a compressed gas or a liquid pump. Any membrane or filter which is chemically compatible with the system and has the desired separating properties can be used. The continuous product is an ultrafiltrate which is collected until the solution retained in the cell has reached the desired concentration or the desired proportion of solvent and of low molecular weight substances dissolved therein has been removed. Suitable ultrafiltration apparatus is described for example in U.S. Pat. No. 3,495,465.

Although ultrafiltration is useful for removing numerous impurities from the coating bath, it does not provide a satisfactory means of removing solubilizing agents from the bath. One reason why is that in industry the ultrafiltrate is used for washing and rinsing freshly coated articles to remove loosely adhering particles from the coating composition. This wash liquor is recycled into the coating bath. Although a portion of the ultrafiltrate is customarily discarded, this is generally not sufficient to remove the excess of acid. For this reason it is necessary to subject at least a portion of the ultrafiltrate to electrodialysis.

Highly suitable electrodialysis cells comprise for example apparatus equipped with flat exchange membranes and sealing frames and containing up to 800 chambers in a parallel arrangement.

The electric field is applied by electrodes at the respective ends of the membrane stack, the electrode rinse being integrated via a separate electrolyte circulation system containing an electrolyte which preferably is sodium sulfate, sodium hydroxide, sodium acetate, acetic acid or sulfuric acid or in the circulation system of chambers $K_2$ with the arrangement of anode and cathode being freely choosable. In the case of a separate electrode rinse circulation system the hydraulic separation from the adjacent process chambers preferably takes the form of cation exchange membranes.

Direct current and current densities j up to 100 $mA/cm^2$, preferably from 1 to 30 $mA/cm^2$, are used. The direct voltage required to this end is dependent on the conductivities of solution and membrane and on the membrane spacing.

The polarity of the electric field is reversed with a frequency of up to 30 $min^{-1}$, preferably from 0.001 to 10, particularly preferably from 0.05 to 0.5 $min^{-1}$. Besides diminishing the buildup on the membranes, reversing the polarity of the electric field is of advantage in the case where the electrodes are integrated into the base circulation system, in that cathodically deposited traces of lead become detached again under anodic conditions following the reversal of polarity. Relatively low frequencies, for example from 0.005 to 0.05 $min^{-1}$, are sufficient for this electrode cleaning operation on account of the very low $Pb^{++}$ content of the base solution.

Suitable electrode materials are for example nickel, platinized titanium or valve metal oxides based on titanium with a ceramic interlayer as described in DE-A-3,339,566.

In the electrodialysis cell, the ultrafiltrate is passed through chambers $K_1$ and the aqueous base through chambers $K_2$.

The aqueous base used is an inorganic or organic base. Suitable inorganic bases are hydroxides or carbonates of alkali metals or alkaline earth metals or of ammonium. Preference is given to sodium hydroxide, potassium hydroxide, sodium carbonate, potassium carbonate, calcium hydroxide, barium hydroxide, ammonia or ammonium carbonate. Suitable organic bases are amines such as the trialkylamines, trimethylamine and triethylamine or auxiliary bases such as diazabicyclooctane and dicyclohexylethylamine or polyamines such as polyethyleneimines and polyvinylamines or quaternary ammonium compounds.

The aqueous bases have a pH of up to 14. Preference is given to a pH from 11 to 13, which can be set via the concentration of the base.

The aqueous base may also contain one or more salts, preferably comprising a cation of the abovementioned bases and an anion of the abovementioned customary acids (solubilizers), in a concentration of from 0.001 to 10 equivalents per liter, preferably from 0.001 to 1 equivalent per liter. Preference is given to sodium acetate, potassium acetate, sodium lactate and potassium lactate.

The process can be carried out continuously or batchwise. In the continuous process the solution passes once through the electrodialysis cell, while in the batchwise process the solution passes through more than once. Said batch process can be converted into a quasi-progressive feed-and-bleed operation by feeding the corresponding solution with fresh ultrafiltrate and fresh base under pH control and at the same time bleeding off deacidified ultrafiltrate and partially neutralized base. In this process, the solutions can pass through the electrodialysis chambers in parallel, cross-flow or counter-current.

Further electrodialysis cells can be arranged in the form of a multistage cascade, in particular in the case of continuous operation.

Suitable ion exchange membranes are prior art membranes which have for example a thickness of from 0.1 to 1 mm and a pore diameter of from 1 to 30 μm and/or a gel-like structure.

The anion exchanger membranes are constructed in accordance with a well-known principle from a matrix polymer which contains chemically bonded cationic groups. In the cation exchanger membranes, the matrix polymer contains anionic groups.

Examples of matrix polymers are polystyrene which has been crosslinked for example with divinylbenzene or butadiene, high- or low-density polyethylene, polysulfone, aromatic polyether sulfones, aromatic polyether ketones and fluorinated polymers.

The cationic groups are introduced into the matrix polymers by copolymerization, substitution, grafting or condensation. Examples of such monomers are vinylbenzylammonium, vinylpyridinium and vinylimidazolidinium salts. Amines which still have quaternary ammonium groups are introduced into the matrix polymer by way of amide or sulfonamide condensation reactions.

The anionic groups, which in general comprise sulfonate, carboxylate or phosphonate groups, are introduced by copolymerization, condensation, grafting or substitution, for example in the case of sulfonate groups by sulfonation or chlorosulfonation.

Membranes based on polystyrene are commercially available for example under the trade names Selemion ® (from Asahi Glas), Neosepta ® (from Tokoyama Soda), Ionac ® (from Ionac Chemical Company) or Aciplex ® (from Asahi Chem.).

Membranes based on polyethylene grafted with quaternized vinylbenzylamine are obtainable under the trade name Raipore ® R-5035 (from RAI Research Corp.), polyethylene grafted with polytetrafluoroethylene under the trade name Raipore R-1035, polyethylene grafted with styrenesulfonic acid under the trade name R-5010 and polytetrafluoroethylene grafted with styrenesulfonic acid under the trade name R-1010.

EP-A-166,015 describes anion exchange membranes based on polytetrafluoroethylene having a quaternary ammonium group bonded via a sulfonamide group. Cation exchange membranes on the basis of fluorinated polymer are obtainable for example under the trade name Nafion ® (from DuPont).

The solutions passed through the electrodialysis cells have a flow velocity of from 0.001 m/s to 2.0 m/s, preferably from 0.01 to 0.2 m/s.

The electrodialysis is carried out at from 0° to 100° C., preferably from 20° to 50° C., and under from 1 to 10 bar, preferably under atmospheric pressure. The pressure drop across the membranes used is up to 5 bar, in general up to 0.2 bar.

The cathodic electrocoating process is used to coat electroconductive surfaces, for example automotive bodies, metal parts, sheets of brass, copper or aluminum, metallized plastics or materials coated with conductive carbon, and also iron and steel, which may have been chemically pretreated, for example phosphatized.

the process of removing acid from the electrocoating bath by electrodialysis is notable for high capacities which can be adapted to the requirements by varying the electric current density. Together with the acid, only insignificant amounts of the other organic and inorganic constituents of the ultrafiltrate are removed.

Experimental arrangement and general description of experiments.

The experiments were carried out on a customary stack electrodialysis laboratory cell (membrane spacing 0.3 cm, free membrane area 37.8 cm$^2$). The cell contained 3 ultrafiltrate chambers ($K_1$), 4 base chambers ($K_2$) and 6 membranes of the type Ionac ® MA 3475. The end base chambers each contained an integral electrode for applying the electric field, a separate electrode rinse cycle being dispensed with. The electrode material used was platinum.

FIG. 1 shows the experimental arrangement, depicting schematically the deacidification process in the cell for two possible polarities A or B of the electric field. The ultrafiltrate chambers (2: feed acidic ultrafiltrate, 1: bleed deacidified ultrafiltrate) and base chambers (3: feed aqueous base, 4: bleed depleted aqueous base+salt) were each connected to a recirculation system composed of a holding tank, a pump and a heat exchanger. During electrodialysis the solutions were pumped through the chambers at a velocity of about 10 cm/s. For continuous deacidification, the process was carried on in such a way as to maintain in the ultrafiltrate cycle the desired residual acid content by metering in acidic ultrafiltrate (2) and in the base cycle the desired base content by metering in a base solution (3). The deacidified ultrafiltrate (1) and the spent base solution (4) were channeled out in a feed-and-bleed operation by means of overflows in the corresponding circulation vessels. The metering in of acidic ultrafiltrate and of base solution was pH controlled. The points of measurement (LF) were disposed in the overflows.

The experiments were carried out at 25° C. with constant current densities. A switching unit made it possible to reverse the polarity of the current at preselectable times.

The feeds used were ultrafiltrates containing acetic acid and, for comparison, a model solution containing sodium acetate and acetic acid.

| Ultrafiltrate: | | |
|---|---|---|
| Solids | (%) | 0.72 |
| Butylglycol | (%) | 0.67 |
| Phenoxypropanol | (%) | 0.22 |
| Na+ | (ppm) | 16 |
| Pb++ | (ppm) | 1225 |
| Cl− | (ppm) | 25 |
| pH | | 5.6 |
| Model solution: | | |
| NaAc | (%) | 0.14 |
| HAc | (%) | 0.023 |
| pH | | 5.4 |

The feed used in the base cycle was 0.1 mol/kg of NaOH. The pH in the overflow was set at 12.0.

Under these conditions, about 90% of the NaOH is utilized (concentrations in bleed: NaOH about 0.01 mol/kg, NaAc about 0.09 mol/kg).

In the examples below, it is shown by reference to the specific capacity, i.e. number of moles of acetic acid (HAc) separated off per hour per m$^2$ of installed total membrane area that a) in clean ultrafiltrates, which contain no or few binder fragments, the capacity drops off markedly above a polarity reversal frequency of 0.05 min$^{-1}$ (Example 1), that b) in ultrafiltrates which contain binder fragments which can form a deposit on the membranes it is possible to find an optimum polarity reversal frequency at which a distinctly higher capacity is achieved than from deacidification without polarity reversal (Example 2), and that c) it is possible to obtain continuous deacidification of an ultrafiltrate containing binder fragments which can form a deposit on the membranes without intermediate rinses by employing suitable conditions (optimum polarity reversal frequency), standstill periods and adaptation of the capacity by varying the current density (Example 3).

EXAMPLE 1

| EXAMPLE 1 | |
|---|---|
| Ultrafiltrate cycle: | Feed = model solution (pH = 5.4) Bleed pH = 6.5 |
| Current density: | j = 105.7 A/m$^2$ |
| Mode of operation: | Variation of polarity reversal frequency |

| Polarity reversal frequency [min$^{-1}$] | 30 | 3 | 1 | 0.5 | 0.25 | 0.1 | 0.05 | 0 |
|---|---|---|---|---|---|---|---|---|
| Capacity [mol of HAc/m$^2$ h] | 0.11 | 0.11 | 0.15 | 0.25 | 0.41 | 0.57 | 0.62 | 0.77 |

EXAMPLE 2

| | |
|---|---|
| Ultrafiltrate cycle: | Feed = ultrafiltrate (pH = 5.6) Bleed pH = 6.4 |
| Current density: | j = 105.7 A/m$^2$ |
| Mode of operation: | Variation of polarity reversal frequency |

| Polarity reversal [min$^{-1}$] | 1 | 0.5 | 0.25 | 0.1 | 0.05 | 0 |
|---|---|---|---|---|---|---|
| Capacity [mol of HAc/m$^2$ h] | 0.098 | 0.182 | 0.150 | 0.058 | 0.032 | 0.002 |

EXAMPLE 3

| | |
|---|---|
| Ultrafiltrate cycle: | Feed = ultrafiltrate (pH = 5.6) Bleed pH = 6.3 |
| Current density: | 0.25 min$^{-1}$ |
| Mode of operation: | Variation of current density with standstill periods |

During the run the capacity was determined at half hour intervals. During the standstill periods the circulation pumps and the electric current were switched off. The ultrafiltrate and the base solution remained in the cell, i.e. the cell was not emptied.

| Time [h] | Current density [A/m$^2$] | Capacity [mol HAc/m$^2$ h] |
|---|---|---|
| 0–0.5 | 105.7 | 0.514 |
| 0.5–1.0 | 105.7 | 0.406 |
| 1.0–1.5 | 105.7 | 0.383 |
| 1.5–2.0 | 105.7 | 0.392 |
| 2.0–2.5 | 105.7 | 0.371 |
| 2.5–3.0 | 105.7 | 0.389 |
| 3.0–3.5 | 105.7 | 0.344 |
| 3.5–4.0 | 105.7 | 0.361 |
| 4.0–4.5 | 105.7 | 0.361 |
| 4.5–5.0 | 105.7 | 0.365 |
| 5.0–5.5 | 52.9 | 0.190 |
| 5.5–6.0 | 52.9 | 0.179 |
| 6.0–6.5 | 52.9 | 0.185 |
| 6.5–7.0 | 52.9 | 0.186 |
| 7.0–24.0 | Standstill | |
| 24.0–24.5 | 52.9 | 0.195 |
| 24.5–25.0 | 52.9 | 0.191 |
| 25.0–25.5 | 0 | 0.041 |
| 25.5–26.0 | 0 | 0.019 |
| 26.0–26.5 | 0 | 0.021 |
| 26.5–27.0 | 0 | 0.016 |
| 27.0–27.5 | 0 | 0.016 |
| 27.5–28.0 | 0 | 0.014 |
| 28.0–28.5 | 0 | 0.012 |
| 28.5–29.0 | 0 | 0.012 |
| 29.0–29.5 | 52.9 | 0.188 |
| 29.5–30.0 | 52.9 | 0.192 |
| 30.0–30.5 | 52.9 | 0.171 |
| 30.5–31.0 | 52.9 | 0.182 |
| 31.0–49.5 | Standstill | |
| 49.5–50.0 | 105.7 | 0.526 |
| 50.0–50.5 | 105.7 | 0.470 |
| 50.5–51.0 | 105.7 | 0.445 |
| 51.0–51.5 | 105.7 | 0.443 |
| 51.5–52.0 | 105.7 | 0.440 |

Analysis of the feeds and bleeds showed that virtually only acetic acid was removed from the ultrafiltrate.

| | pH | Na+ (ppm) | Pb++ (ppm) | Cl− (ppm) | Ac− (ppm) | OH− (ppm) | SC (%) | BG (%) | PP (%) |
|---|---|---|---|---|---|---|---|---|---|
| Ultrafiltrate | | | | | | | | | |
| Feed | 5.6 | 16 | 1225 | 25 | | | 0.72 | 0.67 | 0.22 |
| Bleed | 6.2 | 18 | 1229 | 24 | | | 0.75 | 0.67 | 0.21 |

-continued

|  | pH | Na+ (ppm) | Pb++ (ppm) | Cl− (ppm) | Ac− (ppm) | OH− (ppm) | SC (%) | BG (%) | PP (%) |
|---|---|---|---|---|---|---|---|---|---|
| Base solution |  |  |  |  |  |  |  |  |  |
| Feed | 13 | 2299 | 0 | 0 | 0 | 1701 | 0 | 0 | 0 |
| Bleed | 12.3 | 2179 | <3 | 38 | 4355 | 321 |  | n.d. | n.d. |

SC = solids content
BG = butylglycol
PP = phenoxypropanol
n.d. = not detectable under identical conditions as in the ultrafiltrate The waste obtained per 100 kg of deacidified ultrafiltrate comprised 2.3 kg of a solution containing, in addition to the sodium acetate formed, the remaining unconverted NaOH.

We claim:

1. A process for removing acid from a cathodic electrocoating bath in which an electroconductive substrate is being coated with a cationic resin in the form of an aqueous dispersion by separation of the dispersion by ultrafiltration into a resin dispersion and an ultrafiltrate and deacidification of the ultrafiltrate by passing the ultrafiltrate through the chambers $K_1$ of a direct current operated electrodialysis cell comprising the characteristic sequence $$-(K_2-M_1-K_1-M_1)_n-.$$

where $M_1$ is an anion exchange membrane and n is from 1 to about 500, and passing and aqueous base through the chambers $K_2$, which comprises reversing the polarity of the electric field responsible for ion transport through the membrane.

2. The process of claim 1, wherein the polarity of the direct voltage or the direction of the electric current is changed at a frequency of up to 30 min$^{-1}$.

3. A process as claimed in claim 1, wherein the electrodialysis is carried out at a current density of up to 100 mA/cm$^2$.

4. A process as claimed in claim 1, wherein the flow velocity of fluids in the electrodialysis cells is from 0.001 to 2 m/s.

5. A process as claimed in claim 1, wherein the electrodialysis is carried out at from 0° to 100° C.

6. A process as claimed in claim 1, wherein the aqueous base used has a pH of up to 14.

7. A process as claimed in claim 6, wherein the base used is sodium hydroxide, potassium hydroxide, sodium carbonate, potassium carbonate, calcium hydroxide, barium hydroxide, ammonia, ammonium carbonate, an amine or a quaternary ammonium hydroxide.

8. A process as claimed in claim 1, wherein the aqueous base used additionally contains a salt.

9. A process as claimed in claim 1, wherein the electrodes have been integrated in the two end chambers $K_2$ of the electrodialysis cell.

10. A process as claimed in claim 1, wherein the electrodes have been arranged in two end electrode chambers which have been separated by cation exchange membranes from adjacent chambers $K_1$ or $K_2$ and have been integrated in a separate electrode rinse cycle containing an electrolyte, preferably sodium sulfate, sodium hydroxide, sodium acetate, acetic acid or sulfuric acid.

* * * * *

UNITED STATES PATENT AND TRADEMARK OFFICE
CERTIFICATE OF CORRECTION

PATENT NO. : 5,114,554

DATED : May 19, 1992

INVENTOR(S) : VOSS et al.

It is certified that error appears in the above-identified patent and that said Letters Patent is hereby corrected as shown below:

Columns 9-10

Claims 2-10, Line 1

Please cancel "A" and insert --The--

Columns 9-10

Claims 2-10, Line 1

Please cancel "as claimed in" and insert --of--

Signed and Sealed this

Thirteenth Day of July, 1993

Attest:

MICHAEL K. KIRK

Attesting Officer

Acting Commissioner of Patents and Trademarks